US011675963B2

United States Patent
Agarwal et al.

(10) Patent No.: US 11,675,963 B2
(45) Date of Patent: Jun. 13, 2023

(54) SUGGESTION TECHNIQUES FOR DOCUMENTS TO-BE-TRANSLATED

(71) Applicant: Adobe Inc., San Jose, CA (US)

(72) Inventors: Akulaa Agarwal, Noida (IN); Rajat Budhiraja, Noida (IN); Nishant Rai, Noida (IN); Achintya Dixit, Noida (IN)

(73) Assignee: Adobe Inc., San Jose, CA (US)

( * ) Notice: Subject to any disclaimer, the term of this patent is extended or adjusted under 35 U.S.C. 154(b) by 185 days.

(21) Appl. No.: 16/565,145

(22) Filed: Sep. 9, 2019

(65) Prior Publication Data

US 2021/0073340 A1 Mar. 11, 2021

(51) Int. Cl.
G06F 40/103 (2020.01)
G06N 20/00 (2019.01)
G06F 40/58 (2020.01)
G06F 40/109 (2020.01)
G06V 30/412 (2022.01)
G06V 30/414 (2022.01)
G06V 30/40 (2022.01)

(52) U.S. Cl.
CPC .......... G06F 40/103 (2020.01); G06F 40/109 (2020.01); G06F 40/58 (2020.01); G06N 20/00 (2019.01); G06V 30/40 (2022.01); G06V 30/412 (2022.01); G06V 30/414 (2022.01)

(58) Field of Classification Search
CPC ...... G06F 40/58; G06F 40/103; G06F 40/106; G06K 9/00463; G06N 20/00; G06V 30/412; G06V 30/414; G06V 30/40
See application file for complete search history.

(56) References Cited

U.S. PATENT DOCUMENTS

| 4,980,829 A * | 12/1990 | Okajima | G06F 40/55 704/5 |
| 9,442,923 B1 * | 9/2016 | Abou Mahmoud | G06F 40/42 |
| 2006/0287844 A1 * | 12/2006 | Rich | G06F 9/454 704/2 |
| 2008/0150947 A1 * | 6/2008 | Suzuki | G06F 40/109 345/472 |
| 2009/0083023 A1 * | 3/2009 | Foster | G06F 40/45 704/3 |

(Continued)

OTHER PUBLICATIONS

Github, eddiesigner/sketch-translate-me: Plugin to translate Sketch files in any language, https://github.com/eddiesigner/sketch-translate-me, 5 pages.

Primary Examiner — Kyle R Stork
(74) Attorney, Agent, or Firm — Kilpatrick Townsend & Stockton LLP

(57) ABSTRACT

The present disclosure describes design-time tools that assist a document designer in designing a document that is ready for translation into multiple target languages. In particular, techniques are described that enable a user or designer of a document to, at design time itself, check and verify that text elements included in the document for displaying text content are properly sized for displaying translations of the text content in one or more desired target languages. If a text element is not large enough to contain all the desired translations within its boundaries, i.e., there is at least one translation of the text content that cannot be fully contained within the boundaries of the text element, an indication is provided to the user or designer.

19 Claims, 9 Drawing Sheets

(56) References Cited

U.S. PATENT DOCUMENTS

| | | | |
|---|---|---|---|
| 2010/0114557 A1* | 5/2010 | Fuji | G06F 40/47 |
| | | | 704/4 |
| 2016/0259850 A1* | 9/2016 | McInnis | G06F 40/186 |
| 2017/0017642 A1* | 1/2017 | Cunningham | G06F 40/58 |
| 2018/0113858 A1* | 4/2018 | Peng | G06F 8/38 |
| 2021/0334478 A1* | 10/2021 | Greenberg | G06F 40/51 |

* cited by examiner

SUGGESTION TECHNIQUES FOR DOCUMENTS TO-BE-TRANSLATED

TECHNICAL FIELD

This disclosure generally relates to tools for designing documents. More specifically, but not by way of limitation, this disclosure describes design-time tools that assist a document designer in designing a document that is ready for translation into multiple target languages.

BACKGROUND

Due to globalization, the same content (e.g., a web page) is many times consumed in different languages based upon the geographical area from where the content is accessed. For example, for a web page, the contents of that web page may be output in American English language when the web page is accessed in the United States, in German when the web page is accessed in Germany, in British English language when the web page is accessed in the United Kingdom, in Russian when the web page is accessed in Russia, and so on.

Conventionally, in such scenarios, a designer of a document (which could be a web page, a poster, a book, an artboard, a magazine cover, etc.) uses an application (e.g., a document design application) to specify the design or layout of the document in a particular language. The designer may, for example, specify the content (e.g., images, text content, video content, etc.) to be included in the document and the placement of the content within the document. Once the designer has completed designing the document in the particular language, the document is then translated to different desired target languages. However, this workflow has several problems.

SUMMARY

The present disclosure generally relates to tools for designing documents, and more particularly to design-time tools that assist a document designer in designing a document that is ready for translation into multiple target languages.

The present disclosure describes design-time tools that assist a document designer in designing a document that is ready for translation into multiple target languages. In particular, techniques are described that enable a user or designer of a document to, at design time itself, check and verify that text elements included in the document for displaying text content are properly sized for displaying translations of the text content in one or more desired target languages. The user may use a program such as a document design application ("design application") to configure the document. While designing the document using the document design application, for a text element in the document containing particular text content in a particular language, the designer can check if the size of the text element is large enough to properly accommodate (i.e., be able to contain the translation within the boundaries of the text element) translations of the particular text content in the desired target languages. The size of the text element is defined by values associated with dimensions (e.g., length/width, height) of the text element. In certain embodiments, if a text element is not large enough to contain all the desired translations within its boundaries, i.e., there is at least one translation of the text content that cannot be fully contained within the boundaries of the text element, an indication is provided to the user or designer. Accordingly, text elements in a document that are problematic with respect to size, i.e., whose size is not large enough to accommodate or fit all the translations in the desired target languages, are identified to the user during the design of the document. The user can make then changes to the problematic text elements, such as increase the size of the text elements (e.g., by increasing the length of the text element), at design time itself. In this manner, while designing a document in a particular language (referred to as the source language), for each text element in the document, the designer is able to easily check whether the text element is large enough to fit all the translations of the text content (which is in the source language) associated with that text element. This language check functionality is provided via the design application. In certain embodiments, the language check functionality described herein is enabled using a plugin to the design application.

Certain embodiments involve determining whether a translated text content will exceed the size of a text element, and providing an indication thereof. Text elements such as text boxes may be defined within a document. If the size of text content exceeds the size of a corresponding text element, this may result in design problems such as part of the text content being cut off. Translating a text content to a different language may cause the size of the translated text content to exceed the size of a predefined text element. Techniques are described herein for predicting and initiating mitigation of such text content overflows. For example, a computer system determines a source text content associated with a text element in a document. The source text content is in some initial source language. The computer system determines target languages to which the source string is to be translated. The computer system determines a reference length corresponding to translated text for the text element based upon the source language, the source text content, and the target languages. The reference length may be determined by actually translating the text content, or by predicting a translated length using machine learning. The computer system determines that the length of the text element is less than the reference length. This may indicate that the text element is not large enough to accommodate translated text. The computing system provides an indication that the length of the text element is less than the reference length. For example, the computer system may highlight and/or render a box around text elements that should be adjusted to accommodate translated text. Accordingly, the computer system can alert a user if a translated text content will not fit in a configured text element in the document. The user can then adjust the text element to accommodate the desired target languages.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1A:
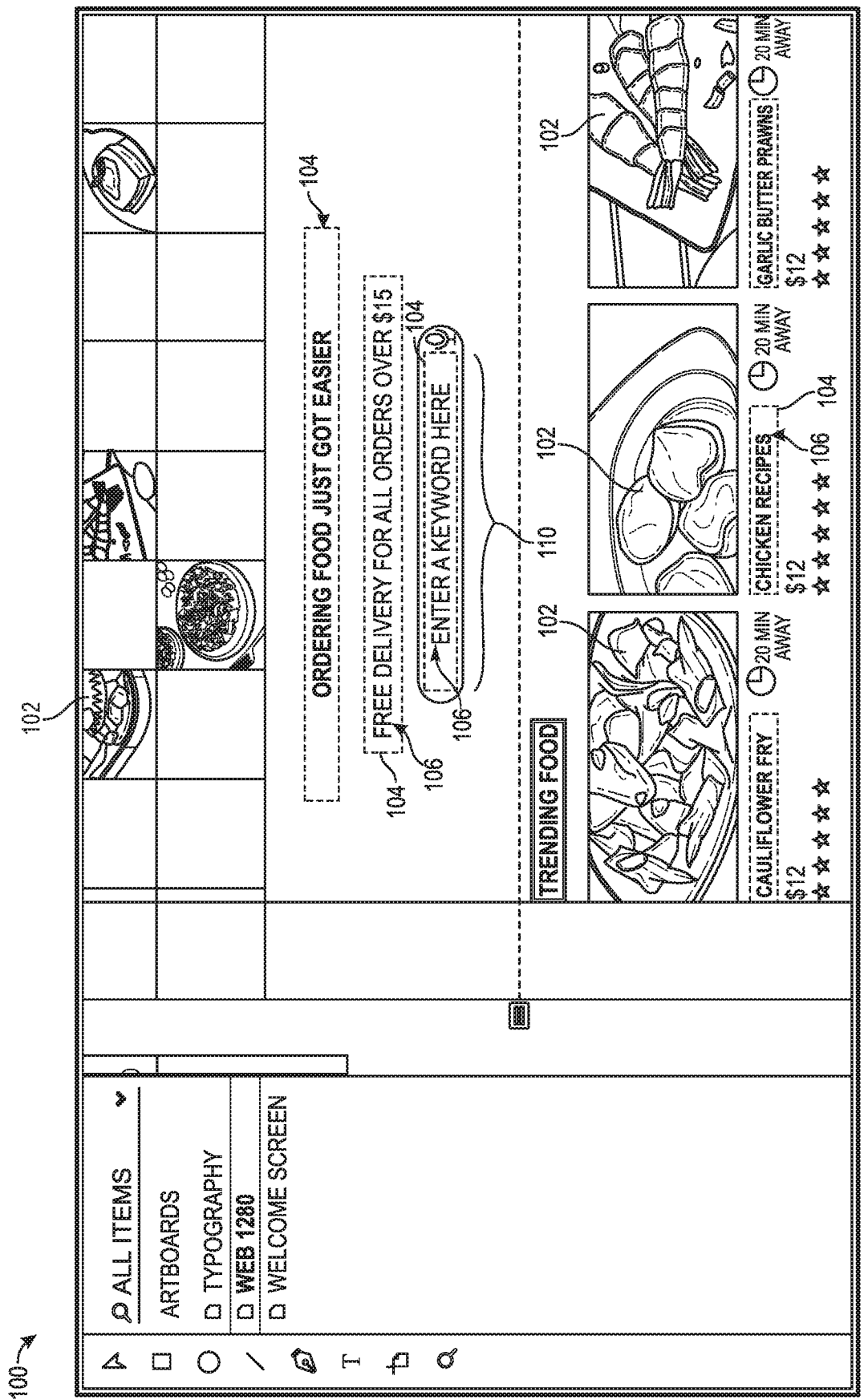
FIGS. 1A-1C depict examples of user interfaces depicting highlighting of problematic text elements, according to some embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "an example" is not necessarily to be construed as preferred or advantageous over other embodiments or designs. Various embodiments are described herein, including methods, systems, non-transitory computer-readable storage media storing programs, code, or instructions executable by one or more processors, and the like.

The present disclosure describes design-time tools that assist a document designer in designing a document that is ready for translation into multiple target languages. In particular, techniques are described that enable a user or designer of a document to, at design time itself, check and verify that text elements included in the document for displaying text content are properly sized for displaying translations of the text content in one or more desired target languages. The user may use a program such as a document design application ("design application") to configure the document. While designing the document using the document design application, for a text element in the document containing particular text content in a particular language, the designer can check if the size of the text element is large enough to properly accommodate (i.e., be able to contain the translation within the boundaries of the text element) translations of the particular text content in the desired target languages. The size of the text element is defined by values associated with dimensions (e.g., length/width, height) of the text element. In certain embodiments, if a text element is not large enough to contain all the desired translations within its boundaries, i.e., there is at least one translation of the text content that cannot be fully contained within the boundaries of the text element, an indication is provided to the user or designer. Accordingly, text elements in a document that are problematic with respect to size, i.e., whose size is not large enough to accommodate or fit all the translations in the desired target languages, are identified to the user during the design of the document. The user can make then changes to the problematic text elements, such as increase the size of the text elements (e.g., by increasing the length of the text element), at design time itself. In this manner, while designing a document in a particular language (referred to as the source language), for each text element in the document, the designer is able to easily check whether the text element is large enough to fit all the translations of the text content (which is in the source language) associated with that text element. This language check functionality is provided via the design application. In certain embodiments, the language check functionality described herein is enabled using a plugin to the design application.

As described in the Background section, conventionally, a user, such as a document designer uses a design application to set the design or layout of a document in a particular language (referred to as source language). The document could be a user interface, a web page, a poster, a book, an artboard, a magazine cover, etc. As part of the layout, the designer may, for example, specify the content (e.g., images, text content, video content, etc.) to be included in the document and the placement of the content within the document. The content can include images, text content, and other types of content.

The placement of text content within a document is usually designed using one or more text elements (also referred to as text frames or text boxes). The term "text element" as used herein refers to a container or bounding region for text content. A text element can have different shapes, such as a rectangle, circle, diamond, heart, and/or the like. A text element may have invisible or visible boundaries. The shape and size of a text element is characterized by associated dimensions (e.g., length/width, height, diagonal size, area, etc.). The designer specifies the size of a text element by setting values for the dimensions of the text element. The dimensions and the values may be specified in different units such as millimeters, inches, pixels, and the like. Text elements thus provide the building blocks for designing the layout of text content within a document. As part of designing a layout for a document, the designer specifies various parameters related to each text element in the document, such as: the dimensions or size of the text element (e.g., width and height of the text element for a rectangle-shaped text element), where the text element is to be located or placed within the document, the text content to be associated with and displayed by the text element, and how the text content is to be displayed within the text element (e.g., font, font size, etc.). A document can be a single or multipage document and can contain one or more text elements of different sizes spread across the document. Text content associated with a text element includes a sequence of characters where the characters can include alphanumeric characters, punctuation marks, symbols, special characters, and/or spaces. The text content associated with a text element may include words and/or one or more sentences. A designer may specify various attributes or parameters for a text element and its associated text content such as a language, a font, a font size, a color, a style, etc.

In a conventional workflow, for each text element in the document being designed, the designer sets the size of the text element (e.g., by setting values for the text element's dimensions such as length and height) and specifies the text content to be associated with and displayed by the text element. The text content is specified in a particular source language, for example, using US English language. For purposes of clarity, the text content specified by the designer in the source language is referred to as the source text content. The user may set the size of a text element such that the entire source text content is contained within the boundaries of the text element. Once the designer is satisfied with the layout, the document is then translated from the source language to one or more target languages and one or more translated documents are generated. Since the length of the text content in the source language (i.e., the length of the source text content) can differ from the length of a translation of that source text content, the designer then has to check each translated document to check whether the text elements designed for the source language are large enough to fit the corresponding translations. For example, the length of a translated text in a particular target language may be longer in length than the source text content and as a result the translated text may not fit in the text element designed for the source text content. This may cause the translated text content to be cut off because the associated text element is not long enough or may cause an overflow of the translated text content beyond the boundaries of the text element into possibly other design elements in the document. In such a situation, the designer has to go back to his document layout and change the size of the text element, for example, by making it long enough to fit the translated text. Conventionally, a designer has to manually do this for every text element in every translated document. This process quickly becomes tedious, time consuming, and expensive.

The problem is made worse when code has to be written for the designed document. For example, once the designer is satisfied with the layout in the source language, the document may be provided to a developer who writes code (e.g., HTML for a web page) for rendering a UI based on the designer's specifications. When changes to sizes of the text elements are made to the layout, the changed layout then has to be provided back to the developer, who then has to rewrite the code for the new layout. This further adds time and expense to the overall workflow of creating versions of a document in multiple different languages.

The above-described problems associated with conventional techniques are remedied by the language check functionality described in this disclosure. A user or designer of a document can, at design time itself, via the design application, check and verify that text elements included in the document for displaying text content in a source language are properly sized for displaying the translations of the text content in one or more desired target languages. In certain embodiments, for a text element included in a document and having associated text content specified in a particular source language, the design application performs language check processing, which highlights the text element if is not large enough to accommodate or fit translations in all the desired target languages of the associated text content. If a text element is not large enough to fit all the desired translations within its boundaries, i.e., there is at least one translation of the source text content that cannot be fully contained within the boundaries of the text element, the situation is highlighted or indicated to the user or designer.

Various different ways may be used to highlight a problematic text element to the user: the text element may be highlighted using a particular color, the boundaries of the text element may be emphasized or highlighted using a particular color, the color of the text content in the text element may be changed, the text content in the text element may be highlighted, information may be output overlapping or proximal to the text element indicating the change(s) that have to be made to one or more dimension(s) of the text element to make the text element large enough to fit all the translations fit within the text element's boundaries, and the like. The indication provided in such a way that the user can very easily, through a visual inspection of the document, identify text elements whose dimensions need to be changed. The user can then, at design time itself, make the necessary changes to the problematic text elements, such as increase the size of the text elements (e.g., by increasing the length of the text element).

In certain embodiments, the language check functionality described in this disclosure is provided an interface (e.g., a graphical user interface (GUI)) of the design application. The design application may allow the user to set the level or granularity at which the language check is to be performed. The granularity could be for a particular selected text element in a document, for multiple selected text elements in the document, at the document-level (i.e., for all text element text elements in the document), or for multiple documents (i.e., for the text elements in the multiple selected documents). The design application GUI may also provide a user-selectable option, which when selected by the user, initiates the language check processing for the user-selections. The user is thus provided a "once-click" option for performing the language check. By providing this language check functionality via the design application itself, the document can be designed for multiple desired target languages at the time of designing the document in the source language. This significantly reduces the effort, time, and expenses associated with translating the same content into multiple languages. In certain embodiments, the language check functionality described herein is enabled using a plugin to the design application.

In certain embodiments, the language check functionality is provided in two different modes or modalities. In a first mode (Mode T), for a text element being checked and having an associated source text content in a source language, the source text content is translated, using one or more translators, to each of the desired target languages. From the multiple translations thus generated, the length of the longest translation is determined. A reference length is then determined based upon the length of the longest translation. The reference length may the same as the length of the longest translation, or may be the length of the longest translation plus some additional added length for stylistic purposes. The reference length represents the minimum length for the text element to properly fit all the translations in the desired target languages. The reference length is then compared with the length of the text element. If the reference length is determined to be longer than the length of the text element (or alternatively, the length of the text element is smaller than the reference length), then the text element is identified as a problematic text element and an indication to that effect is provided to the user.

In a second mode (Mode ML), machine learning techniques are used as part of the language check processing. In this second mode translations are not needed. In certain embodiments, supervised machine learning techniques are used to train a model that can take as inputs the source text content, the source language, and the desired target languages, and output a prediction of the length of a text element needed to fully fit all the translations in the desired languages. The length predicted by the machine learning model represents the reference length and is then compared with the length of the text element to determine whether the text element is long enough. If not, the text element is identified as a problematic text element and an indication to that effect is provided to the user. Unlike the first mode, in the second mode, actual translations are not performed. As a result, the language check processing can be performed in faster time and can also be performed in offline mode as long as the model is available on the processing device.

As used herein, the term "language" is used to refer to a system of verbal and/or written symbols used by a particular group. Examples of languages include English, Spanish, Arabic, and Mandarin. Language may further refer to locale-based dialects such as American English language, as spoken and written in the United States (e.g., using the spelling color), and British English language, as spoken and written in Great Britain (e.g., using the spelling colour). Different languages may be associated with different characters (e.g., the Latin alphabet, simplified Chinese characters, etc.). Different languages, in written form, may be associated with different configurations (e.g., characters may be arranged on a page from left to right, right to left, or top to bottom).

The following non-limiting example is provided to introduce certain features of the language check functionality. A designer is using a design application to design a web page. The designer specifies the layout for text elements in various regions of the web page, and identifies text content for each text element in the source language, which is English for this example. The designer specifies the text content to be associated with each text element by entering the text content, in the English language, into the text element. The designer interacts with a button displayed via an interface (e.g., a graphical user interface (GUI)) of the design application labeled "Check Languages." Upon detecting user selection of the button, the design application initiates the language check processing. In certain embodiments, the design application invokes and executes a language check component that implements the language check functionality. This component may be provided as a plugin to the design application. If the user has not previously selected or identified the desired target languages, the design application displays a GUI or modal to the user that allows the user to select the desired target languages to be checked. In this example, the user selects the target languages: German, French, and Spanish. Via the same GUI, the user also selects a mode (Mode T—actual translations performed) for the processing.

As part of the language check processing, the web page is analyzed to identify all the text elements on the web page, and for each text element, the associated source text content. The language check component identifies three text elements with respective text contents—"Your Favorites," "Super Moisturizer," "Bath Bomb—Vanilla," and "Nail Polish—Red."

For each text element in the web page and its associated source text content, the following processing is performed (example is described for text element with content "Your Favorites"). For this example, it is assumed that Mode T is selected or is active.

(1) The "Your Favorites" text content is translated to German, French, and Spanish.
(2) From the translations generated in (1), the length of the longest translation is determined.
(3) Based upon the length determined in (2), a reference length is determined, where the reference length represents the minimum length for the text element to fit the largest translation. In certain embodiments, the reference length is the same as the length of the longest translation determined in (2). In other embodiments, the reference length is equal to the length of the longest translation plus some additional length added for stylistic purposes.
(4) The reference length determined in (3) is then compared with the length of the text element and it is determined that the length of the text element is smaller than the reference length, i.e., the text element is not long enough.
(5) Responsive to the determination in (4), an indication is provided to the user highlighting that the text element is not long enough to fit all the desired target language translations. Information may also be output indicating the reference length for the text element determined in (3). The specific translation that does not fit may also be superimposed on the text element.

Figure 1B:
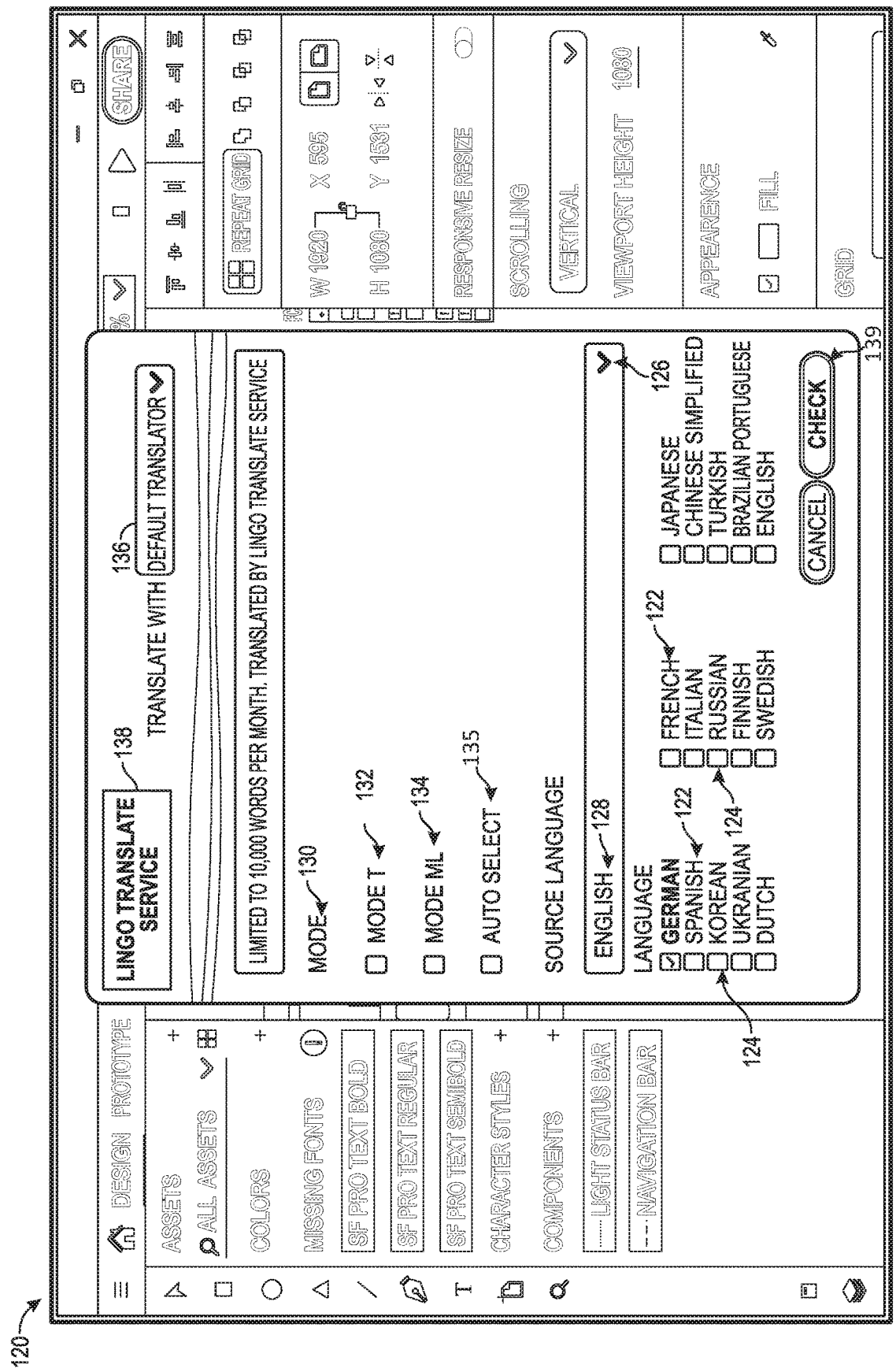
Figure 1C:
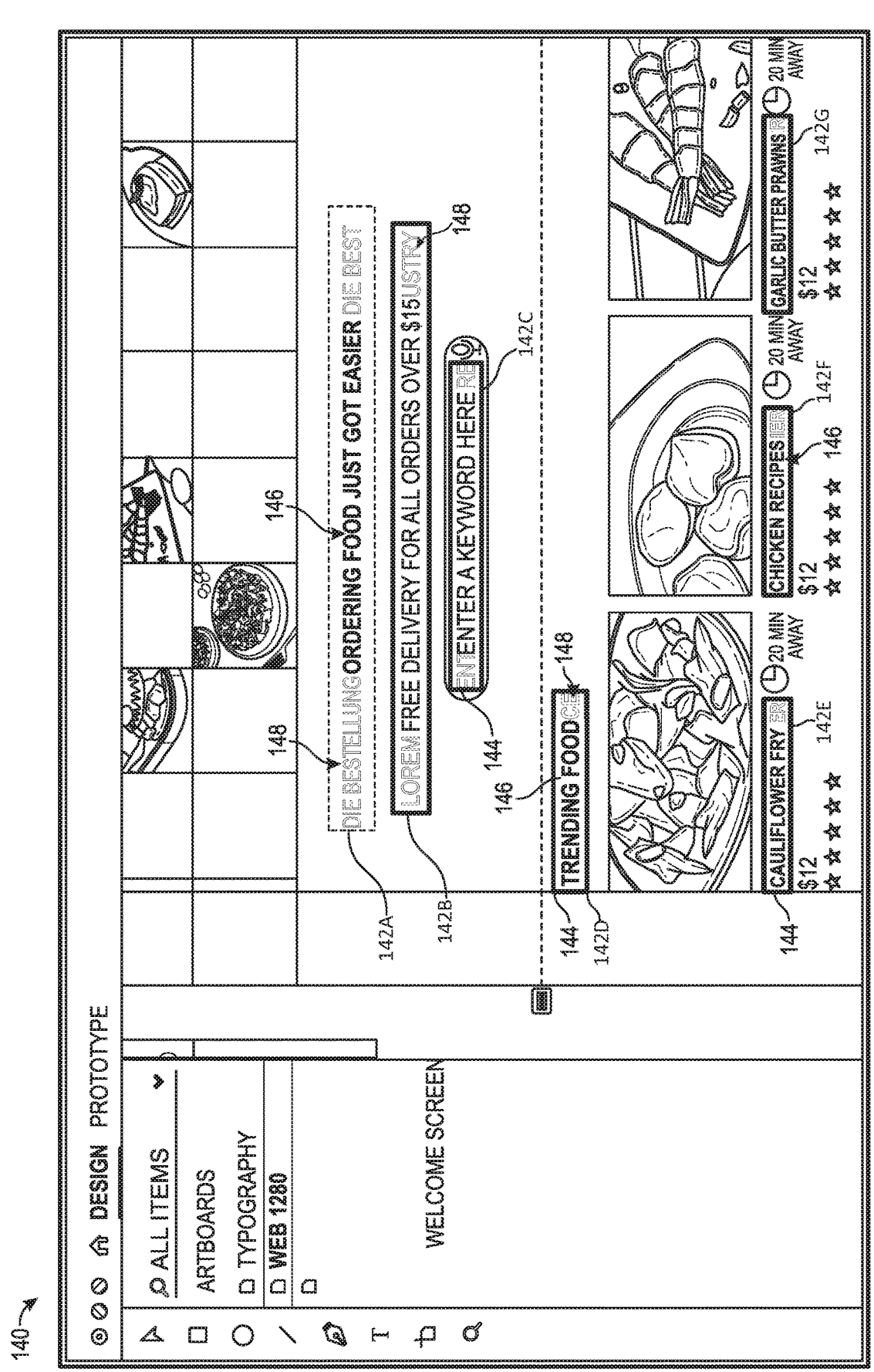

Referring now to the drawings, FIGS. 1A-1C depict examples of user interfaces (e.g., graphical user interfaces (GUIs)) depicting highlighting of problematic text elements, according to some embodiments. FIG. 1A shows a document 100 for which a design is being configured by a user using a design application.

In FIG. 1A, the document 100 includes images 102 and text elements 104. Each text element 104 is characterized by a particular size and contains text content 106. The size of a text element 104 may correspond to a length 110, which may be measured in pixels, millimeters (mm), inches, and so forth. The size of a text element 104 may also be defined by a height of the text element 104, a diagonal measurement of the text element 104, and/or the like. As shown in FIG. 1A, the document 100 comprises multiple text elements and associated text content, some of which have been referenced using references 104 and 106 in FIG. 1A.

FIG. 1B shows an example of a GUI interface 120 that allows a user to specify parameters related to the language check processing. Interface 120 provides an area 128 where the user can enter the source language. A dropdown 126 is provided for selecting the source language. In the example in FIG. 1B, English has been selected as the source language. GUI interface 120 also provides an area below 128 for allowing the user to select one or more target languages. A user can interact with one or more of the check boxes 124 to select one or more languages 122. In the example, in FIG. 1B, German has been selected as the target language. Multiple target languages may also be selected.

The interface 120 further includes components for selecting a language check mode 130. A user can select a mode via checkboxes as shown in FIG. 1B. The mode options include a first mode, "Mode T" 132 and a second mode, "Mode ML" 134. Interface 120 further provides a checkbox corresponding to an Auto Select option 135, in which the system may select Mode T or Mode ML. As described above, the language check processing can be performed according to a "Mode T" wherein actual translations are performed, and in a "Mode ML" a machine learning model is used and translations are not needed.

For purposes of Mode T, the user can also select one or more translators to be used for the translation. For example, the interface 120 further includes a drop-down menu 136 for selecting a translation service 138. The user may be given the option to select different third-party translation services to perform the translation (e.g., Lingo Translate Service, as shown in FIG. 1B). Alternatively, or additionally, a default translation service or application may be used to perform the translations.

Interface 120 further includes a "Check" button 139. Upon detecting user interaction with the Check button 139, the system may initiate language check functions, according to the parameters entered via interface 120.

FIG. 1C shows an example of a GUI 140 for displaying results of the language check processing performed for target language German selected in FIG. 1B. Several text elements, including text elements 142B, 142C, 142D, 142E, and 142F are indicated in FIG. 1C as not being long enough to fit the German translations. Text element 142A can accommodate the German translation, and no indication 144 is displayed. On the other hand, text elements 142B-142G are shorter than the German translations 148. Accordingly, an indication 144 (e.g., a bold solid box around the text) is shown in association with text elements 142B-142G. The source text content 146 (e.g., in English) is shown in the text elements 142, along with an overlay showing the target (translated) text content 148 (e.g., in German). The overlay of target text content 148 may be, for example, in a lighter color and/or transparent to distinguish the target text content 148 from the source text content 146. Both the source text content 146 and the target text content 148 are shown in each text element 142A-142G (i.e., for both the text elements that should be adjusted and for the text element 142A that does not require adjustment).

Based on the indication that the length of the text element is less than the length of the translated text content, the user can readjust the design of the document so that the document is ready for translation into any of the selected languages.

Figure 2:
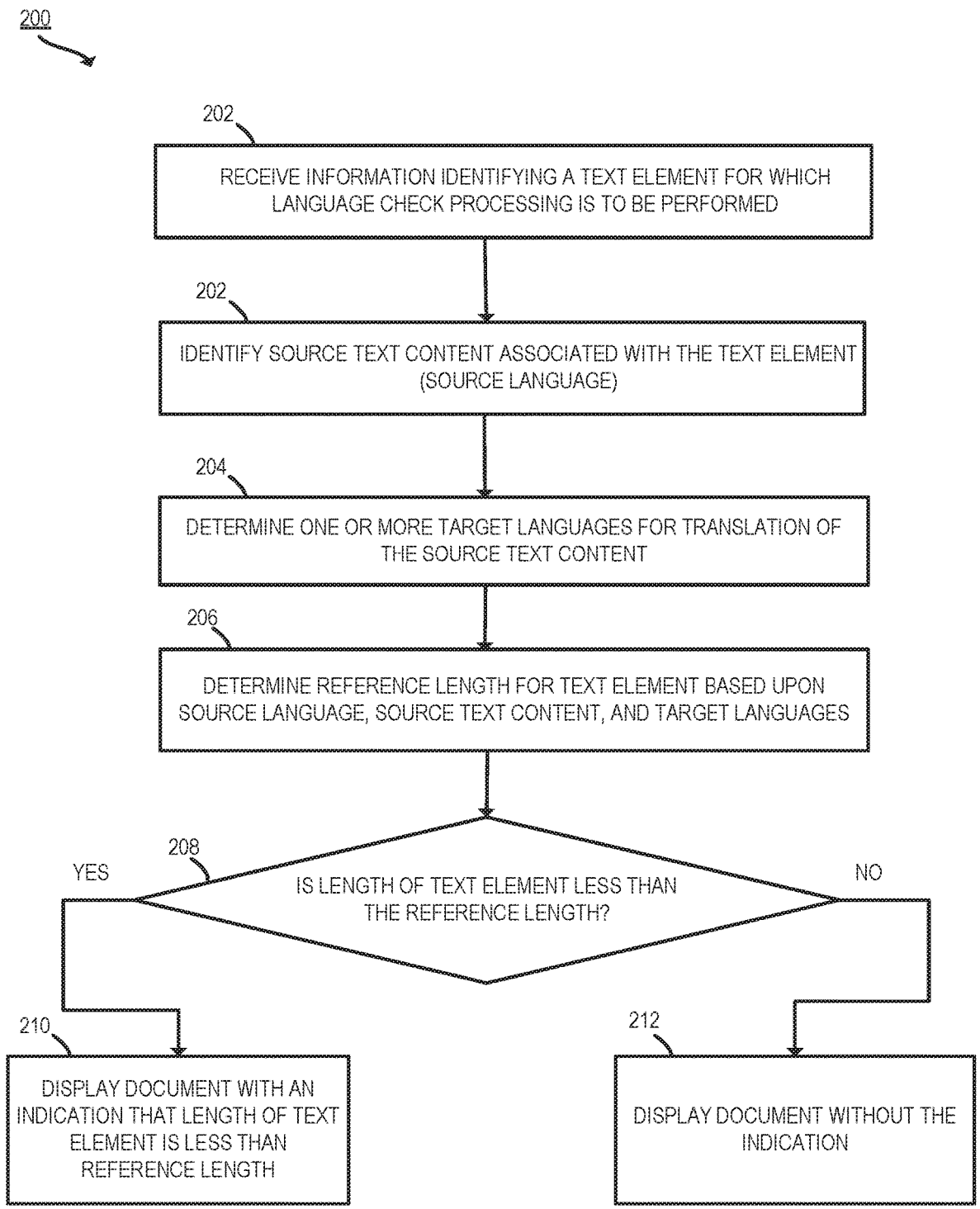
FIG. 2 is a flowchart depicting a method for performing language check processing, according to some embodiments.

FIG. 2 depicts a simplified flowchart 200 depicting a method for performing language check processing according to certain embodiments. The processing depicted in FIG. 2 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 5, the processing depicted in FIG. 2 may be initiated by design application 510 and performed by language check component 502 in cooperation with other elements of a distributed system, as illustrated FIG. 5.

As a prelude to the processing depicted in FIG. 2, a user may have opened a document comprising one or more text elements in a design application. For example, the user may be designing the layout of the document using the design application. Through the interface provided by the design application, the user may select one or more text elements in the document for which language check processing is to be performed. Flowchart 200 in FIG. 2 shows the language check processing performed for a single text element in a document. If multiple text elements are selected for the check, then the process depicted in FIG. 2 may be repeated for each of the selected text elements. If a document (or multiple documents) has been selected for the check, then the processing may be performed on all the text elements in the document(s).

There are different ways in which a user can select a subset of the text elements in a document for which language check processing is to be performed. The design application GUI may allow a user to click upon individual text elements to be selected. In certain embodiments, the user may highlight a portion of the document and all the text elements in the highlighted portion are selected. After the selections have been made, the user may then interact with an interface element such a button (e.g., labeled "language check") provided by the design application GUI to initiate the language check processing. Processing for each text element may then be performed per flowchart 200 depicted in FIG. 2. In certain embodiments, the design application may invoke a plugin (e.g., language check component 502 depicted in FIG. 5) which is then executed by one or more processors and performs the processing depicted in FIG. 2 (an also FIGS. 3 and 4) to be performed.

At 201, information is received identifying a text element for which language check processing is to be performed. At 202, for the text element identified in 201, the source text content associated with the text element in a document is determined. The source text content is in a source language.

As part of the processing in 202, the document may be analyzed to identify the source text associated with the text element being checked. For example, the document may have a hierarchical structure (e.g., a DOM structure) represented by a tree of nodes, with nodes representing elements in the document. The nodes in the tree may represent text elements, other UI elements (e.g., buttons), etc. The document structure tree may have contain one or more parent-child relationships that identify containment relationships, where a parent node in the tree contains a child node of that parent. For example, for a text element placed on a button in the document, in the tree hierarchy, the button may be represented by a node that is a parent of a node representing the text element.

The document structure, for example, as represented by a hierarchical tree model, may be analyzed to identify one or more text elements to be checked and their corresponding text content in the source language. If the entire document is to be checked, the whole document may be searched to identify text elements and their associated source text content. A unique identifier may be assigned to each text element and its associated source text content. If a selected subset of the text elements in the document are to be checked, then the document structure may be analyzed to identify the selected text elements and their associated text content.

In some embodiments, as part of the processing in 202, additional information associated with the text element being checked may be determined. This additional information may include, for example, information identifying the source language of the source text content, a font (source font) of the source text content, a font size (source font size) of the source text content, whether the text element includes multi-line text, configuration parameters associated with multi-line text (e.g., whether multi-line text is configured to wrap and/or break to a new line at certain points), and the like. Layout or style related information associated with the text element may also be determined, where the style information includes information such as margins and/or padding for the text element, etc.

At 204, the one or more target languages for which the language check processing is to be performed are determined. The target languages may be determined based on user input (e.g., via an interface as shown in FIG. 1B). The desired target languages may also be preconfigured, for example, by the user. For example, the target languages may be specified in a configuration file that has been configured by a user at a time prior to requesting the language check processing. This configuration file may then be accessed and read as part of the processing in 204.

In some embodiments, one or more of the target languages may be identified based on a geographic location determined for the user requesting the language check processing. For example, when a request is received from a user to perform the language check processing, the global positioning system (GPS) data of a user device from which the request was received may be obtained and a geographic location of the user device determined from the GPS data. As another example, an internet protocol (IP) address of the user computing system may be identified and used to identify a location. The determined location may then be used to identify one or more target languages. For example, if the geographical location is determined to be in Montreal, where French (Canadian dialect) and English are commonly spoken, these languages may be identified as the target languages in 204.

As part of the processing in 204, in addition to identifying the target languages, for each target language, a font and a font size to be used for the target language may be determined. Different fonts may be associated with different languages, e.g., to account for different characters used in the different languages. In certain instances, the font and the font size of the source text content are selected as the font and font size for the target language. In some other instances, the font for a target language may be a preconfigured default font (which could the same as or different from the font of the source text content), and the font size of the source text content is selected as the font size for the target language. In yet other instances, both the font and the font size for the target language may be based upon some preconfigured or recommended font and/or font size. In some embodiments, mapping information may be provided including mappings between a target language and a font (and/or a font size) to be used for that target language. Mappings may also be provided between the source language and a target language, for example, English Font A maps to Spanish Font B, English Font Y maps to Spanish Font Z, etc.

In certain embodiments, when a user specifies the target languages for which the language check processing is to be performed, the user may also be provide the option (e.g., via a GUI interface) to specify a font and/or a font size to be used for each target language. The GUI may present, to the user, a list of target fonts and/font sizes for the use to select from. The language check component may maintain a set of font mappings (e.g., English Font A maps to Spanish Font B, English Font Y maps to Spanish Font Z, etc.).

At 206, a reference length is determined for the text element received in 201. The reference length represents the minimum length for the text element to accommodate or fit within the boundaries of the text element all of the translations of the source text content in the target languages. The reference length in 206 is determined based on various inputs such as the source language, the source text content, and the target languages identified in 204. Additionally, stylistic attributes associated with the text element, such as the margins, padding within the text element, etc. may be used for determining the reference length. Additionally, stylistic attributes associated with the target languages, such as the font and font size to be used for the translations may be used to compute the margins/padding within the text element, etc. may be used for determining the reference length.

Figure 3:
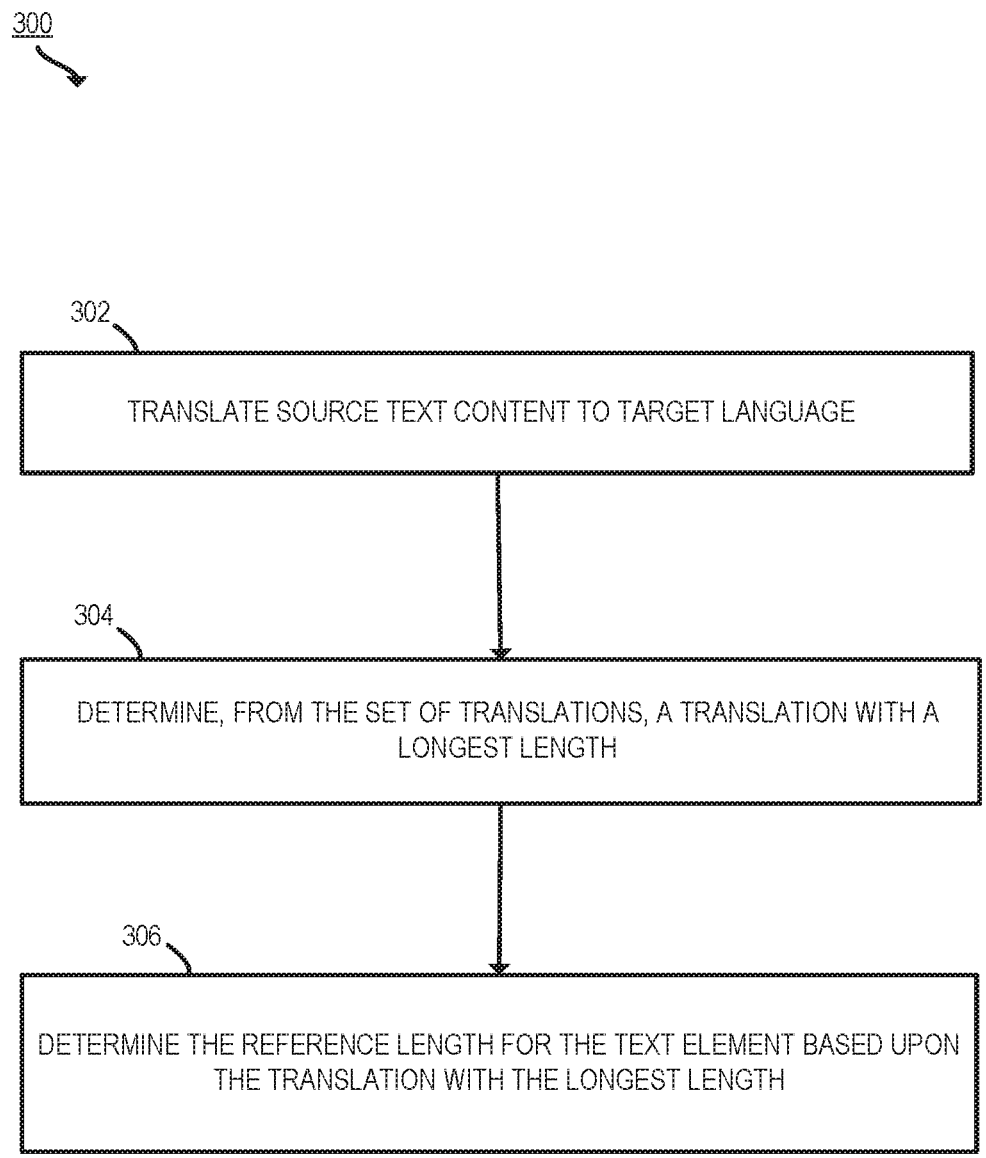
FIG. 3 is a flowchart depicting a method for using "Mode T" to determine the reference length of FIG. 2, according to some embodiments.
Figure 4:
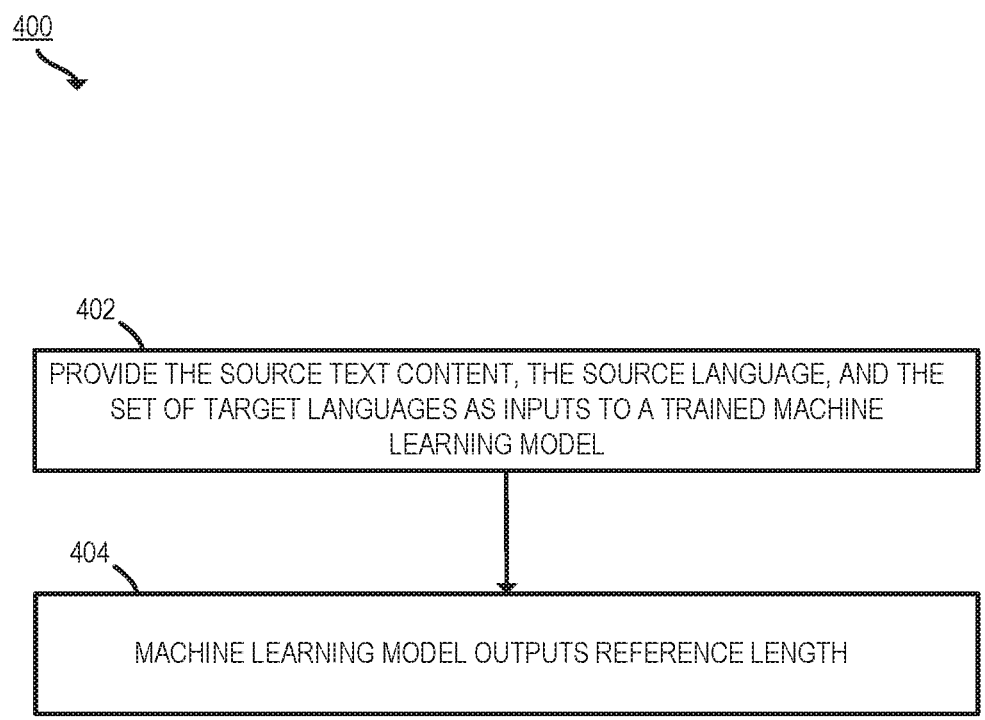
FIG. 4 is a flowchart depicting another method for using "Mode ML" to determine the reference length of FIG. 2, according to some embodiments.

The manner in which the reference length is computed in 206 depends upon the mode of operation of the language check processing. In a first mode (Mode T), the source text content is actually translated into the target languages, the length of the longest translation is determined, and the reference length is then computed based upon the length of the longest translation. Details related to the processing performed in Mode T for computing the reference length are depicted in FIG. 3 and described below. In a second mode (Mode ML), machine learning techniques are used to predict the reference length. Details related to the processing performed in Mode ML for predicting the reference length are depicted in FIG. 4 and described below.

At 208, the reference length value computed in 206 is compared to the length of the text element to check whether the length of the text element is less than the reference length. If it is determined in 208 that the length of the text element is less than the reference length, then in 210, an indication or information is output to the informing the user that the length of the text element is less than the reference length. The indication in 210 may be provided in various different ways such as, without limitation: by highlighting the text element (e.g., with a color such as yellow, a color that is different from the color used to display text elements that do not suffer from the length deficiency); by displaying a box around the text element so that the box is distinguishable from the existing design of the document (e.g., by displaying a red box around the text element); by highlighting the boundaries of the text element using a particular (e.g., red) color; by highlighting the source text content present in the text element such as by using a different color, bolding, etc. In certain embodiments, quantitative information may be output on or proximal to the text element, such as information displaying the required reference length for the text element, an amount by which the text element should be increased in size, and/or the like. In some embodiments, a translated version of the source text content in the target language that does not fit in the text element may be displayed, for example, as an overlay over the source text content (e.g., as a slightly translucent overlay as illustrated in FIG. 1C) or instead of the source text content.

The indication is 210 is displayed in such a way that the user can very easily, through a visual inspection of the document, identify text elements whose dimensions need to be changed. The user can then, at design time itself, make the necessary changes to the problematic text elements, such as increase the size of the text elements (e.g., by increasing the length of the text element).

In some embodiments, not only will problematic text be identified, but will also be automatically rectified. For example, the system may increase the length of a text element based on the determined reference length of the longest target language translation. Based on determining that the length of the text element is less than the reference length, the length of the text element may be modified to be equal to or greater than the reference length. The system may determine whether to automatically rectify the text based on user configuration. As an example, the interface of FIG. 1B may further include a check box corresponding to an automatic global ready feature, which the user may or may not select. Prior to modifying the size of problematic text element(s), the system may highlight the text element(s) to call the user's attention to the fact that certain elements are being changed in the document. In some cases, the user may be presented with a GUI modal requesting user input to accept or not accept the automatic length change for the text element.

Referring back to 208, if it is determined in 208 that the length of the text element is not less than the reference length, then there is no need to provide any indication of any problem. Accordingly, in 212, the text element may be displayed without any special indication. In certain embodiments, as part of 212, information may be output for the text element so that the user knows that the particular text element has been checked for the target languages.

In the embodiment depicted in FIG. 2 and describe above, the reference length is computed and the length of the text element is checked against the reference length. This however is not intended to be restrictive. Other dimensions of the text element may also be checked. For example, in some embodiments, a reference height may be computed and the height of the text element compared to the reference height. For example, the reference height may be computed based on heights of the translations in the target languages using particular fonts and font sizes. An indication may be provided for the text element if the height of the text element is less than the reference height. As another example, the language check component may determine a reference diagonal size for the text element. The reference diagonal size may be based on a combination of target language font data and the translated text content.

In some embodiments, as part of determining the reference length and/or reference height, the multi-line style aspect of the text element may be taken into consideration. As part of the language check processing, based upon whether a multi-line option has been selected, a determination may be made as to whether additional lines of text would be needed to accommodate the translated text. In some instances, instead of recommending an increase to the length of the text element, the recommendation and indication may instead recommend an increase to the height of the text element to accommodate an extra line (or lines) to fit in the translations in the target languages. In some instances, an indication may be provided that both the height and the length (or some other dimensions) of the text element need to be increased.

In some embodiments, the system may further generate translated documents. The document may be duplicated on a per-language basis. For example, the system may identify source text content in the document, translate the text content to generate translated text content, and replace the source text content with translated text content. This process may be iterated to generate documents with text content in various languages (e.g., a version the document with Spanish text, a version of the document with Portuguese text, and so forth). The system may retrofit translated text content into the document design. The system may replace source text with translated text. The system may identify text elements in which to place such translated strings using unique identifiers of the respective text elements and/or unique identifiers of the text contents.

A user or designer may use the processing depicted in FIG. 2 to check the various text elements in a document being designed during the design process itself. In this manner, during the design process itself, the document is made "globally ready" for translations to multiple target languages. The language check processing described herein enables the user to be confident in that the text elements in the document have already been checked against the desired target languages. Once the user is satisfied with the overall design and all the text elements have been checked per language check processing, the document may be used as a template for generating documents in the target languages. Unlike in a conventional workflow, the user no longer has to check the text elements in each of the translated documents. Alternatively, the document may be provided to a developer for writing code for the document (e.g., HTML for a web page).

FIG. 3 depicts a simplified flowchart 300 depicting a method for computing the reference length in the first mode (Mode T) according to certain embodiments. The processing depicted in FIG. 3 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 5, the processing depicted in FIG. 3 may be initiated by design application 510 and performed by language check component 502 in cooperation with other elements of a distributed system, as illustrated FIG. 5. In certain embodiments, the processing depicted in FIG. 3 is performed as part of the processing performed in 206 in flowchart 200 depicted in FIG. 2.

At 302, for each target language identified in 204 in FIG. 2, the source text content is translated to that target language. Accordingly, in 302, a translation is obtained for the source text content in each of the target languages identified in 204. The translations may be performed using one or more translation engines. These translation engines may be provide by translator applications and/or translation services (e.g., translation services provided by cloud service providers) accessible to the design application and/or the language check component that performs the language check processing. In certain embodiments, the translated text may be different based upon the translation engine that is used. In some embodiments, the user may select the translation engine(s) to be used. If not specifically selected by the user, certain preconfigured default translation engine(s) may be used. In some embodiments, translations for the same target language may be obtained from two or more engines, the resultant translations may be compared one of the translations used. In some other embodiments, multiple translations may be used. A translation application or a translation service may be invoked by the design application (or by the language check component) be via an application programming interface (API)) provided by application or service.

For each target language, the translation is generated in the target language and in the target font and using the font size that is determined to be used for that target language. As previously described, as part of the processing 204, for each target language, a font and a font size to be used for the target language is determined. These determined fonts and font sizes are used for generating the translations in 302.

At 304, from the translations obtained/generated in 302 for the multiple target languages, the translation with the longest length is identified. The length of a translation may be measured using different metrics such as length in mm, pixels, etc. For example, the source text content "Welcome," for a given font size, may be determined to have a length of 3 mm long. When translated to German, "Willkommen," in a corresponding German font size, it may be determined to be 3.5 mm long. When translated to Spanish, "Bienvenidos," in a corresponding Spanish font size, it may be determined to be 3.6 mm long. The language check component may then compare the determined lengths (e.g., string(English)<string (German)<string(Spanish)) and determine in 304 that the Spanish translation, with a length of 3.6 mm is the longest or lengthiest translation.

At 306, the reference length for the text element is computed based upon the length of the longest translation determined in 304. In some embodiments, the reference length may be set to the length of the longest translation for the source text content (i.e., reference length=length of the longest translation). For example, the reference length may be set to 3.6 mm, which is the length of the Spanish translation in the example above. In some other embodiments, the reference length may be set to the length of the longest translation plus some additional added length for stylistic purposes. For example, the length of the longest translated text content may be incremented by some additional length, which could be predetermined (e.g., a predetermined value such as 0.05 mm). As a specific example, continuing with the above illustration in which Spanish is the longest translation at 3.6 mm, the reference length would be set to 3.65 mm (computed by adding 0.05 mm to the longest translation length of 3.6 mm).

Various other stylistic attributes associated with the text element and/or associated with the text element, such as margins, padding, etc. may also be taken into account when computing the reference length. For example, if the text element is configured to have certain margins along the left and right edges of the text element, those margins may be added to length of the longest translation and the additional length to arrive at the reference length. The reference length computed in 306 may then be used for subsequent processing in 208 in FIG. 2.

FIG. 4 depicts a simplified flowchart 400 depicting a method for predicting a reference length in the second mode (Mode ML) according to certain embodiments. The processing depicted in FIG. 4 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 5, the processing depicted in FIG. 4 may be initiated by design application 510 and performed by language check component 502 in cooperation with other elements of a distributed system, as illustrated FIG. 5. In certain embodiments, the processing depicted in FIG. 3 is performed as part of the processing performed in 206 in flowchart 200 depicted in FIG. 2.

In certain embodiments, a predictive model built using supervised machine learning techniques may be used to determine the reference length. The trained model may be built to take as inputs: source language, source text content associated with the text element, and a set of target languages. The trained model may be built to output a prediction for the reference length for the text element.

Accordingly, at 402, for a text element being checked, inputs are provided to the trained model including: the source text content, the source language, and a set of target languages. For example, the source string may be "Research Results." The source language is English, and the set of target languages may be Japanese, Mandarin, and Gujarati. In certain embodiments, the user may be asked to provide the input value via a GUI interface. In some other embodiments, some or of the inputs may be determined from analyzing the document structure and based upon preconfigured or default parameters (e.g., the target languages, the font, the font sizes, etc.), based upon the location of the user, etc. For example, the target languages may be determined based on identifying a geographical region identified based on GPS data and based upon common languages spoken in the region.

At 404, the machine learning model outputs a predicted reference length. In some cases, the length value predicted by the model may be incremented by a predetermined value for stylistic reasons (e.g., add 0.1 mm to account for padding around the text content) to arrive at the reference length.

In certain embodiments, a single predictive model may be trained that is able to predict the reference length given multiple target languages, for example, as described above for 402 and 404. In alternative embodiments, instead of a single model, separate predictive models may be trained, each trained for a specific target language. Each such model may be trained to take as inputs source language and source text content associated with the text element and output a required length for a translation in the target language for which the model was trained. For example, a model trained for Spanish will predict the length needed for the Spanish translation of the source text content. In such an embodiment, as part of 404, the multiple models to be used corresponding to the multiple target languages may first be identified. The source language and source text content may then be provided to each of the multiple identified models, and each model may output a length value prediction. The longest predicted value from among the predicted values may then be determined. The reference length may then be computed based upon the longest predicted length value. In some embodiments, the reference length may be set to the length of the longest predicted value. In some other embodiments, the reference length may be set to the length of the longest predicted value plus some additional length added for stylistic purposes (e.g., a certain preconfigured length, length for margins, padding, etc.). The reference length that is computed is then used for further processing in 208 in FIG. 2.

It is to be noted that the processing depicted in FIG. 2 and described above, using one or multiple predictive models, does not involve actual translations of the source text content. This can provide several benefits. For example, because actual translations are not required, there is no need to use or communicate with translation services or applications, possibly over a network. As a result, the language check processing can be performed faster as compared to the processing requiring actual translations. Further, if the predictive model is available on the user's computing device, the language check processing can be performed without any internet/network connectivity. Thus, the language check processing in the second mode that uses machine learning techniques can be performed in offline mode.

In certain embodiments, the user can select the particular mode to be used for performing the language check processing. For example, the user may prefer to select the machine learning mode or method when the user is offline or when time is of the essence and the user wants quick results. On the other hand, the user may prefer to select the translation method when the user wishes to see actually see the translations.

For the machine learning mode, a predictive model first has to be built and trained before it can be used for performing the processing shown in FIG. 4 and described above. In certain embodiments, the predictive model may be built and trained using supervised machine learning techniques. The model may be trained using a training set comprising labeled data including multiple training examples. Each training example includes a set of input features, and a known output (also referred to as the ground truth or label) for the set of input features. For example, in the context of building a model for language check processing, and where one model can handle multiple target languages, for a training example, the set of input features may identify a source language, a source text content, and a set of target languages, and the known output may identify the known length required to fit or accommodate translations of the source text content for the target languages identified in the set of input features.

In certain embodiments, a neural network may be used as the machine learning model. The neural network may comprise multiple nodes organized into layers, with an input layer configured to receive inputs, an output layer configured to output predictions, and zero or more layers (referred to as hidden layers) between the input and output layers. The nodes in a layer are configured to receive inputs from another layer (e.g., from a previous layer), compute outputs, and forward the outputs to nodes of another layer (e.g., to the next layer). In certain embodiments, a node in a layer is configured to receive inputs, weight the inputs based upon weights associated with the inputs to the node, aggregate the weighed inputs to generate a weighed aggregate, and then apply an activation function to the weighed aggregate to generate the output, which is then communicated to one or more nodes of another layer. The neural network including the nodes of the neural network may be implemented in software only (e.g., code, instructions, program) executed by one or more processing units (e.g., processors, cores) of the respective systems, in hardware, or combinations thereof.

The neural network may be trained using back propagation techniques and the training set, wherein through multiple iterations, the weights associated with the nodes in the neural network are adjusted such that, for the set of input values in the training set, the error between the output generated by the neural network and the expected/known or ground truth output is minimized. The trained neural network may then be used to make predictions for the processing depicted in FIG. 4. The use of neural networks is not meant to be limiting. In alternative embodiments, various other machine learning techniques may be used to build and train predictive models that are then used for making length predictions.

In certain embodiments, models may be built for a certain geographical area. For example, in Ireland, the languages of interest may be English (Irish dialect) and Gaelic. Accordingly, a model for Ireland may be trained based on the English (Irish dialect) and Gaelic languages. The training data may include text contents in the relevant languages. In some embodiments, the training data may be labeled or otherwise correlated to guide the model to identify corresponding text contents in different languages (e.g., Hello in English corresponds to Dia dhuit in Gaelic). The machine learning models may be trained to predict a reference length based on given input text content. In some embodiments, the machine learning models may be trained to predict a longest target text content element of a set of text content in two or more respective languages.

In the embodiment depicted in FIG. 4 and describe above, the reference length is predicted. This however is not intended to be restrictive. Other dimensions of the text element may also be predicted in alternative embodiments. For example, in some embodiments, a reference height, or a height value used to generate the reference height may be predicted and compared to the height of the text element. Predictions may also be made with respect to other one or more dimensions of a text element.

Figure 5:
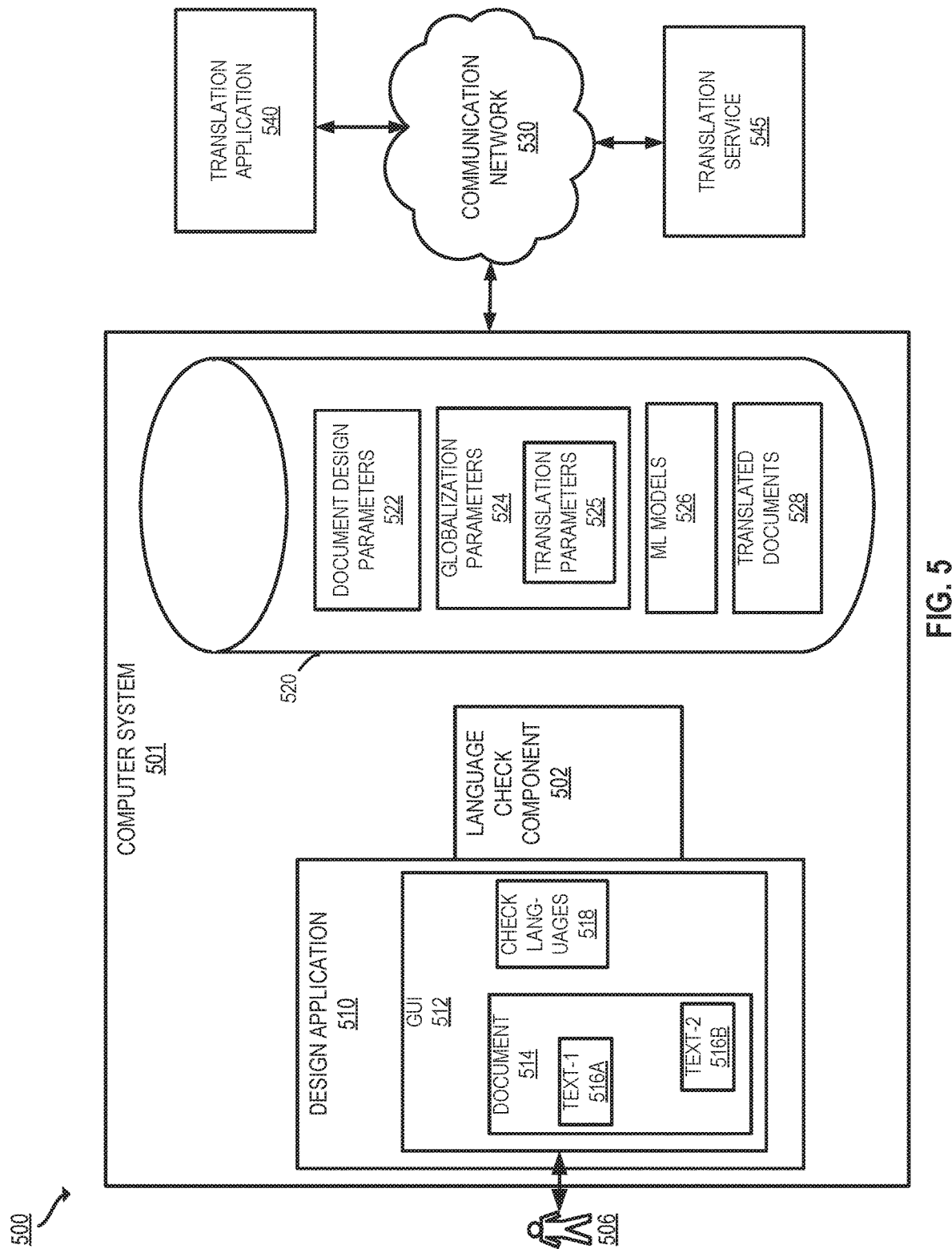
FIG. 5 depicts an example of a distributed system according to certain embodiments of the present disclosure.

FIG. 5 depicts an example of a distributed system according to certain embodiments of the present disclosure. The distributed system 500 may include a computer system 501 coupled to a translation application 540 and a translation service 545 via a communication network 530.

The elements in FIG. 5 may communicate over a communication network 530 such as the Internet, or via a series of direct connections, a hybrid of the two, or any other appropriate method of communication between entities. Further, in some embodiments, there may be multiple translation applications 540, translation services 545, and/or computer systems 501. In some embodiments, elements and operations described with respect to the computer system 501 may be housed and/or executed on external devices coupled to the computer system 501 via the communication network 530.

The computer system 501 may include a computing device such as a personal computer, laptop, tablet, and/or the like. The computer system 501 may include a design application 510, a language check component 502, and application memory 520.

The design application 510 may be an application for a user 506 to configure a document design. The user 506 may be a designer, such as a graphic designer configuring an art board. The design application 510 may include hardware and/or software for receiving, identifying, and storing design information for a document. Such design information may include placement and configuration of text, images, videos, and/or the like.

The design application may include a graphical user interface (GUI) 512. GUI 512 may display elements to the user 506 for configuring a document 514, and, in particular, configuring text elements (e.g., text-1 516A and text-2 516B) based on translation information generated by language check component 502. Example GUIs are illustrated in FIGS. 1A-1C. The GUI may display content to, and receive information from, the user 506.

GUI 512 may display a document 514. The document 514 may be configured by the user 506 to include various elements including text elements (text-1 516A, text-2 516B, etc.). The text elements (text-1 516A and text-2 516B) may be configured by user 506 to accommodate text content to be included in the document 514. The GUI 512 further includes a check languages button 518. The check languages button 518 may invoke language check component 502 when the design application 510 detects user interaction with the check languages button 518.

In some embodiments, the language check component 502 is a component or plugin of the design application 510 for checking text element lengths in connection with one or more target languages. The language check component 502 may include hardware and/or software configured to identify text content in a document and parse the text content. The language check component 502 may include functionality to identify target languages into which the text content may be translated. The language check component 502 may include functionality to identify the target languages via input from the user 506 and/or information about the computer system 501 such as GPS data, operating system (OS) data, and/or the like. The language check component 502 may include functionality to identify a reference length associated with a text element. The language check component 502 may include functionality to determine a reference length by obtaining a translated text content and/or by using a machine learning model to identify the reference length. The language check component 502 may include functionality to compare the reference length to the length of the text element. If the length of the text element is less than the reference length, then the language check component 502 may cause the GUI 512 to display an indication thereof to the user 506.

In some embodiments, the application memory 520 includes one or more devices for storing electronic data. The application memory 520 may be implemented using any combination of any number of non-volatile memories (e.g., flash memory) and volatile memories (e.g., DRAM, SRAM), or any other non-transitory storage medium, or a combination of media. In some embodiments, the application memory 520 is configured to store data used in operations performed by the language check component 502 and/or design application 510. The data stored by the application memory 504 may include document design parameters 522, globalization parameters 524, machine learning models 526, and translated documents 528.

The document design parameters 522 may be parameters related to the placement of elements in a document such as text elements, images, and/or the like. The document design parameters 522 may include background colors and patterns. The document design parameters 522 may include selected or default fonts and colors for one or more elements of source text content.

The globalization parameters 524 may include information about document design parameters associated with different regions. The globalization parameters 524 may include translation parameters 525 such as different languages and fonts associated with different languages. Each language may be associated with a default font. The globalization parameters 524 may further include regional design parameters. For example, some languages relate to words which read from left to right or up to down. The globalization parameters may specify such language directions.

The machine learning (ML) models 526 are models trained to predict reference dimensions such as a reference length. The reference length and/or other reference dimensions may be predicted by a machine learning model 526 based on inputs such as a source text content, a source language, and a set of target languages. In some embodiments, different machine learning models may be stored to the computer system 501 in association with different regions. For example, in California, the source language is commonly English and the target languages are commonly Spanish, Vietnamese, and Tagalog. Accordingly, a machine learning model trained on text translated from English to Spanish, Chinese, Vietnamese, and Tagalog is stored for California. Another machine learning model may be stored for South Africa, which uses the source language English and the target languages Zulu, Xosa, Afrikaans, Northern Sotho, and Sotho. In some embodiments, the machine learning models may be trained on one or more server computers prior to being stored to the computer system 501. Accordingly, the computer system 501 can store and execute pre-trained models with relatively low memory and computational requirements.

The translated documents 528 are documents that have been translated from a source language to a target language. The translated documents 528 may include translated text, fonts, as well as modified document parameters such as text element size, text element placement, and the placement of images, negative space, videos, and/or the like.

The translation application 540 may be an application for translating text. The translation application 540 may be associated with the design application 510 and the language check component 502. The translation application 540 may include software and/or hardware configured to translate text from a source language to a target language. The input to the translation application 540 may include text content in a source language and a target language for translation. The output of the translation application 540 may include text content in the target language.

The translation service 545 may be a third-party service for translating text. The translation service 545 may include similar functionality to the translation application 540. The translation service 545 may be invoked by the language check component 502 via an API. In some embodiments, the language check component 502 may maintain keys for accessing such third-party translation service APIs.

Figure 6:
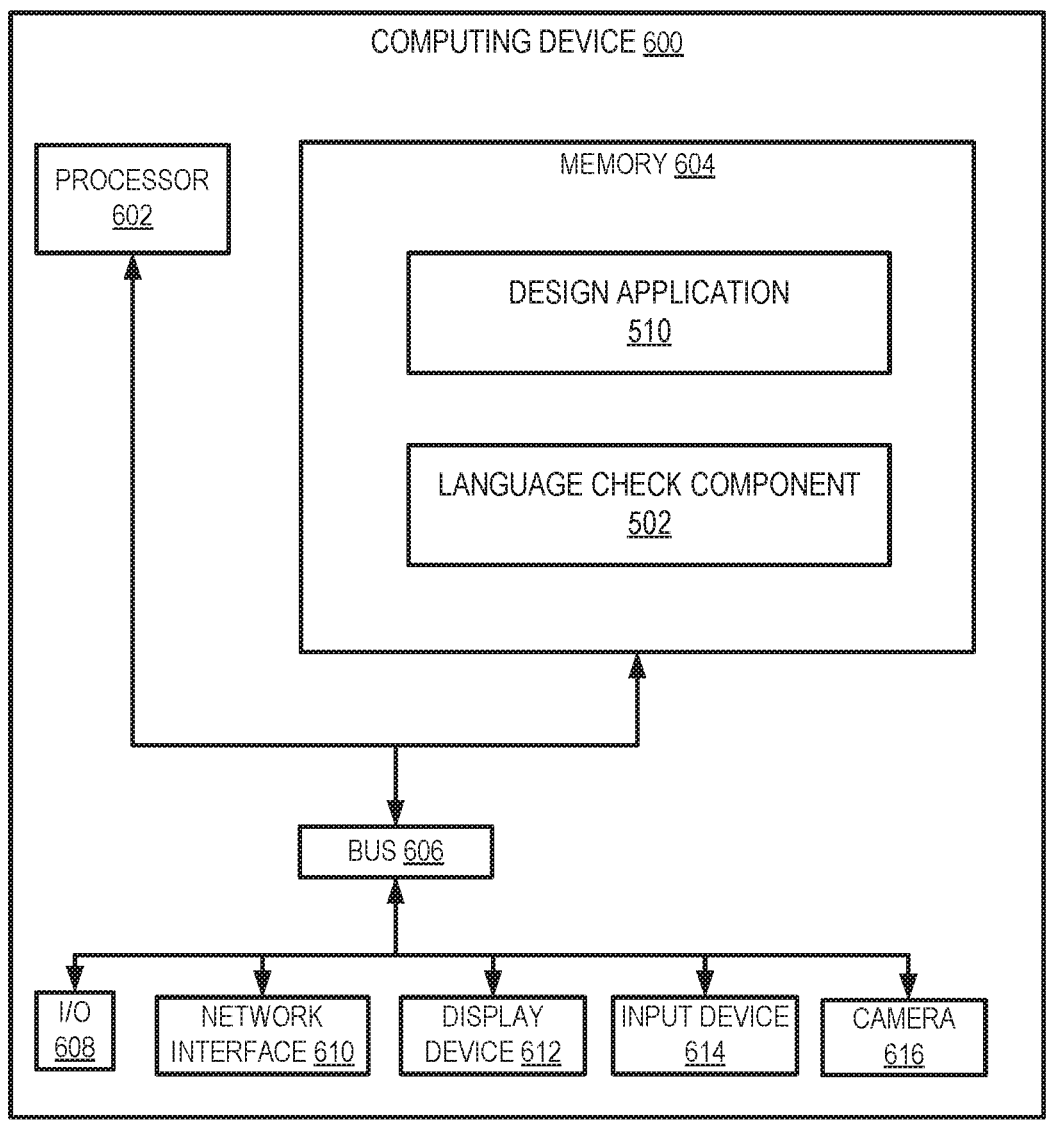
FIG. 6 depicts an example of a computing system that performs certain operations described herein, according to certain embodiments of the present disclosure.

Any suitable computing system or group of computing systems can be used for performing the operations described herein. For example, FIG. 6 depicts examples of a computing device 600 that executes a design application 510 and a language check component 502 (as described above with respect to FIG. 5).

The depicted examples of a computing device 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing device 600 may also include a number of external or internal devices, such as input or output devices. For example, the Computing device 600 is shown with one or more input/output ("I/O") interfaces 608. An I/O interface 608 can receive input from input devices or provide output to output devices. One or more buses 606 are also included in the computing device 600. The bus 606 communicatively couples one or more components of a respective one of the computing device 600.

The computing device 600 executes program code that configures the processor 602 to perform one or more of the operations described herein. The program code may correspond to the design application 510 and the language check component 502 and/or other suitable applications that perform one or more operations described herein. The program code may be resident in the memory device 604 or any suitable computer-readable medium and may be executed by the processor 602 or any other suitable processor. In some embodiments, the design application 510 and language check component 502 are stored in the memory device 604, as depicted in FIG. 6. In additional or alternative embodiments, one or more of the design application 510 and language check component 502 are stored in different memory devices of different computing systems. In additional or alternative embodiments, the program code described above is stored in one or more other memory devices accessible via a data network.

In some embodiments, one or more of these data sets, models, and functions are stored in the same memory device (e.g., the memory device 604). For example, a device, such as the computer system 501 depicted in FIG. 5, can host the design application 510 and the language check component 502. In additional or alternative embodiments, one or more of the programs, data sets, models, and functions described herein are stored in one or more other memory devices accessible via a data network.

The computing device 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and the like. The computing device 600 is able to communicate with one or more other computing devices via a data network using the network interface device 610.

Figure 7:
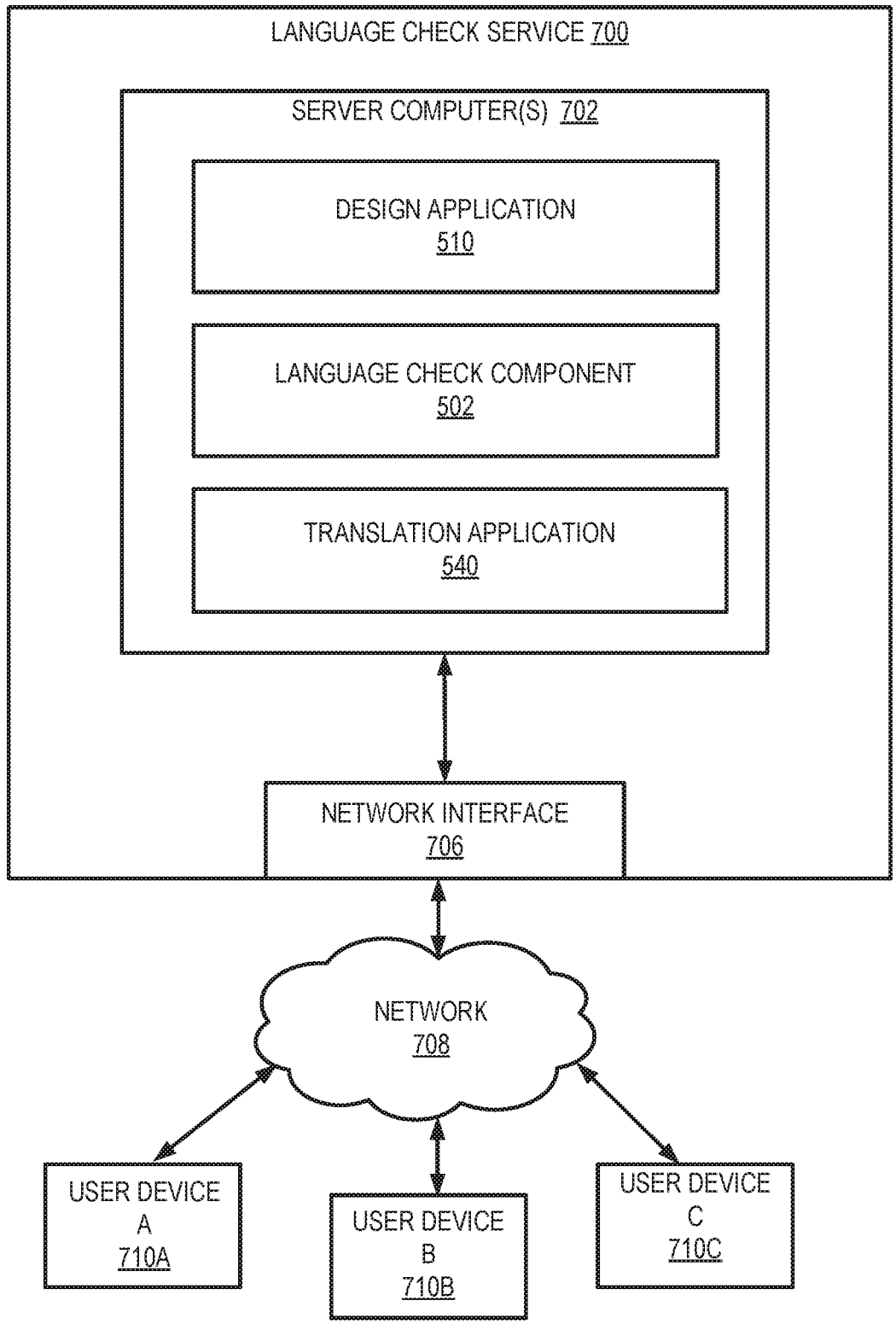
FIG. 7 depicts another example of a computing system that performs certain operations described herein, according to certain embodiments of the present disclosure.

In some embodiments, the functionality provided by the computing device 600 may be offered as a cloud-based language check service 700 by a cloud service provider. For example, FIG. 7 depicts an example of a cloud-based language check service 700 offering one or more language checking services that can be used by a number of user subscribers using user devices 710A, 710B, and 710C across a network 708. In certain embodiments, the language checking services provided by the language check service 700 include a service that generates an indication that a text element has a length less than an identified length of text content when translated to one or more target languages, based on input parameters (e.g., document design parameters 522 and globalization parameters 524) supplied by the user devices 710A, 710B, and 710C. In some cases, the photo guiding services may be offered under a Software as a Service (SaaS) model. One or more users may subscribe to the language checking services, and the language check service 700 performs the processing to provide the language checking services to subscribers. The language check service 700 may include one or more remote server computer(s) 702.

The remote server computer(s) 702 include any suitable non-transitory computer-readable medium for storing program code (e.g., code for the design application 510, language check component 502 and translation application 540), memory, or both, which is used by the language check service 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 702 can include volatile memory, non-volatile memory, or a combination thereof.

One or more of the server computer(s) 702 execute the program code (e.g., via the language check component 502, design application 510, and translation application 540) that configures one or more processors of the server computer(s) 702 to perform one or more of the operations that provide language checking services, such as generating an indication that a text element has a length less than an identified length of text content when translated to one or more target languages. Any other suitable systems or subsystems that perform one or more operations described herein (e.g., a subsystem for training machine learning models) can also be implemented by the language check service 700.

In certain embodiments, the language check service 700 may implement the services by executing program code and/or using program data, which may be resident in a memory device of the server computer(s) 702 or any suitable computer-readable medium and may be executed by the processors of the server computer(s) 702 or any other suitable processor. In certain embodiments, the memory includes any of the data described above with respect to the application memory 520 of FIG. 5. The data may be stored on the same memory device or distributed across different memory devices accessible via the network 708.

The language check service 700 also includes a network interface device 706 that enables communications to and from the language check service 700. In certain embodiments, the network interface device 706 includes any device or group of devices suitable for establishing a wired or wireless data connection to the network 708. Non-limiting examples of the network interface device 706 include an Ethernet network adapter, a modem, and/or the like. The language check service 700 is able to communicate with the user devices 710A, 710B, and 710C via the network 708 using the network interface device 706.

Embodiments of the disclosure have multiple advantages. For example, translated text will not be truncated or overflow the designated area. Further, the techniques disclosed herein allow designers to address any design issues at design time, which reduces the turnaround time for localizing a product even before development efforts are put in. Without these techniques, to generate an end-product such as a UI, the designer would design a document on a first computer, transmit the design information to a second developer computer, which may perform development operations before passing the developed end-product to a globalization computer which translates the text. If the text does not fit properly in the configured design, the designer would have to retool the document. Accordingly, a great deal of processing, time, and network messaging is spared by using the techniques of the present disclosure to foresee translation issues at design time.

Further computational efficiency can be provided by using the machine learning techniques described herein to predict a reference length. The machine learning models can be stored locally to the computer on which a document is being designed. Accordingly, messaging to external devices need not be performed in order to identify when a translated string will overflow from a text element configured for a different source language. This speeds up the language check processing by obviating the need to wait for messages to be transmitted and received over a network.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by a computer system, the method comprising:
    determining source text content associated with a text element in a document, wherein the source text content is in a source language;
    identifying a set of two or more target languages to which the source text content is to be translated;
    computing a reference length for the text element based upon the source language, the source text content, and the set of target languages by:
        providing the source text content, the source language, and the set of target languages as inputs to a trained machine learning model;
        responsive to providing the inputs, receiving a predicted length output by the machine learning model, wherein the machine learning model predicts the predicted length without translating the source text, and wherein the predicted length is a prediction of a length of a text element needed to fully fit any of the translations in the two or more target languages, and wherein the machine learning model comprises a neural network pretrained to output a predicted length for the text element based on input text and a set of target languages using supervised machine learning; and
        determining the reference length for the text element based upon the predicted length;
    determining that a length of the text element is less than the reference length; and
    responsive to determining that the length of the text element is less than the reference length, providing an indication that the length of the text element is less than the reference length.

2. The method of claim 1, wherein the source text content is a first source text content, the text element is a first text element, and the reference length is a first reference length, the method further comprising:
    determining a second source text content associated with a second text element;
    computing, based upon the source language, the second source text content, and the set of target languages, a second reference length by:
        generating a set of translations for the second source text content by, for each target language in the set of target languages, generating a translation of the second source text content in the target language;
        determining, from the set of translations, a translation having a longest length; and
        determining the second reference length for the second text element based upon the length of the translation with the longest length, wherein the reference length is long enough to fully contain the translation with the longest length within boundaries of the text element.

3. The method of claim 2 wherein determining the second reference length for the second text element based upon the length of the translation with the longest length comprises setting the second reference length to the length of the translation with the longest length.

4. The method of claim 2 wherein determining the second reference length for the second text element based upon the length of the translation with the longest length comprises:
    determining additional length; and
    setting the second reference length to be the length of the translation with the longest length plus the additional length.

5. The method of claim 1, further comprising:
    analyzing the document to identify a set of text elements contained in the document, the set of text elements including the text element with which the source text content is associated.

6. The method of claim 1, wherein the providing the indication comprises one or more of: displaying a translated version of the source text content, highlighting the text element, or displaying a box around the text element.

7. The method of claim 1, wherein the providing the indication comprises displaying the text element in a particular color.

8. The method of claim 1, wherein the providing the indication comprises one or more of: displaying the reference length proximal to the text element or displaying an amount by which the length of the text element is to be changed by to satisfy the reference length.

9. The method of claim 1, further comprising:
    determining, for at least one target language in the set of one or more target languages, a target font for translation of the source text content, and
    wherein computing the reference length comprises using the target font to compute the reference length.

10. The method of claim 9, further comprising:
determining, for the at least one target language in the set of one or more target languages, a target font size for translation of the source text content, and
wherein computing the reference length comprises using the target font size to compute the reference length.

11. The method of claim 1:
where determining the source text content is performed responsive to a request received from a user device;
the method further comprising determining a geographical location for the user device; and
wherein identifying the set of one or more target languages comprises determining at least one target language based upon the geographical location of the user device.

12. The method of claim 1, further comprising:
based on determining that the length of the text element is less than the reference length, modifying the length of the text element to be equal to or greater than the reference length.

13. The method of claim 1, further comprising:
automatically increasing a length of the text element responsive to determining that the length of the text element is less than the reference length.

14. A computer system comprising:
a processor; and
an output device;
wherein the processor is configured to execute a design application and a plugin associated with the design application, wherein execution of the plugin causes processing comprising:
determining a source text content associated with a text element in a document opened in the design application, wherein the source text content is in a source language;
determining a set of two or more target languages to which the source text content is to be translated;
determining a reference length for the text element based upon the source language, the source text content, and the set of target languages by:
providing the source text content, the source language, and the set of target languages as inputs to a trained machine learning model;
responsive to providing the inputs, receiving a predicted length output by the machine learning model, wherein the machine learning model predicts the predicted length without translating the source text, and wherein the predicted length is a prediction of a length of a text element needed to fully fit any of the translations in the two or more target languages, and wherein the machine learning model comprises a neural network pretrained to output a predicted length for the text element based on input text and a set of target languages using supervised machine learning; and
determining the reference length for the text element based upon the predicted length;
determining that a length of the text element is less than the reference length; and
causing an indication to be output via the output device, the indication indicating that the length of the text element is less than the reference length.

15. The computer system of claim 14, wherein execution of the plugin causes further processing comprising, responsive to determining that the length of the text element is less than the reference length, providing an indication that the length of the text element is less than the reference length.

16. The computer system of claim 15, wherein the providing the indication comprises one or more of: displaying a translated version of the source text content, highlighting the text element, or displaying a box around the text element.

17. The computer system of claim 14, wherein the source text content is a first source text content, the text element is a first text element, and the reference length is a first reference length, the processing further comprising:
determining a second source text content associated with a second text element;
determining, based upon the source language, the second source text content, and the set of target languages, a second reference length by:
generating a set of translations for the second source text content by, for each target language in the set of target languages, generating a translation of the second source text content in the target language;
determining, from the set of translations, a translation having a longest length; and
determining the second reference length for the second text element based upon the translation with the longest length, wherein the reference length is long enough to fully contain the translation with the longest length within boundaries of the text element.

18. The computer system of claim 14, the processing further comprising:
automatically increasing a length of the text element responsive to determining that the length of the text element is less than the reference length.

19. A non-transitory computer-readable medium having instructions stored thereon, the instructions executable by a processing device to perform operations comprising:
determining a source text content associated with a text element in a document, wherein the source text content is in a source language;
determining a set of two or more target languages to which the source text content is to be translated;
determining a target font for the source text content,
determining a reference length for the text element based upon the source language, the source text content, the set of target languages, and the target font by:
providing the source text content, the source language, and the set of target languages as inputs to a trained machine learning model;
responsive to providing the inputs, receiving a predicted length output by the machine learning model, wherein the machine learning model predicts the predicted length without translating the source text, and wherein the predicted length is a prediction of a length of a text element needed to fully fit any of the translations in the two or more target languages, and wherein the machine learning model comprises a neural network pretrained to output a predicted length for the text element based on input text and a set of target languages using supervised machine learning; and
determining the reference length for the text element based upon the predicted length;
determining that a length of the text element is less than the reference length; and
responsive to determining that the length of the text element is less than the reference length, providing an indication that the length of the text element is less than the reference length.

* * * * *